Nov. 7, 1939.  B. COTTER  2,178,719

FASTENING DEVICE

Filed Aug. 23, 1937

Inventor
Bart Cotter
By Blackmore, Spencer & Flint
Attorneys

Patented Nov. 7, 1939

2,178,719

UNITED STATES PATENT OFFICE 2,178,719

FASTENING DEVICE

Bart Cotter, Detroit, Mich., assignor to General Motors Corporation, Detroit, Mich., a corporation of Delaware Application August 23, 1937, Serial No. 160,377

3 Claims. (Cl. 24—73)

This invention relates to fastening devices of the type which are employed to secure a part to an apertured supporting member which is relatively thin so that a portion of the fastening device may extend through the aperture in order that it may expand in back of the supporting member and thereby be held in place in the aperture, another portion of the fastening device being attached to the part which is to be secured to the supporting member.

One object of the invention is to provide such a fastening device wherein the portions which expand after passage through the aperture in the supporting member are so devised that they will be free to move in a contracting or expanding direction with respect to the body portion of the fastening device without changing the position of the portions of the fastening device which are attached to the part which is to be secured to the supporting member.

Another object is to so construct the fastening device that it may be used in connection with supporting members of varying thicknesses, and also so that it will be capable of firmly holding parts of different dimensions in position against the supporting member.

Other objects and advantages will be apparent upon reference to the following description and accompanying drawing, in which Fig. 1 is a transverse sectional view through a supporting member and a part which is secured thereto by means of my improved fastening device.

Figure 1:
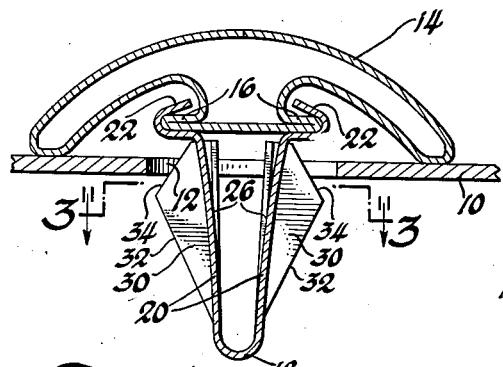
Figure 2:
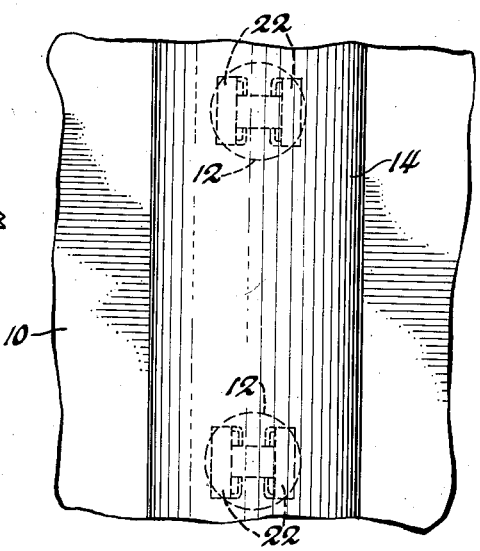
Fig. 2 is a view in elevation of the structure shown in Fig. 1.

The reference numeral 10 indicates a relatively thin supporting member having an aperture 12 formed in it, and 14 is a part which is to be secured to the supporting member. The part in this instance is illustrated as being a molding formed of sheet metal, having an inverted T-shaped portion formed on its underside by bending the metal outwardly and then back upon itself to form flanges 16.

Figure 4:
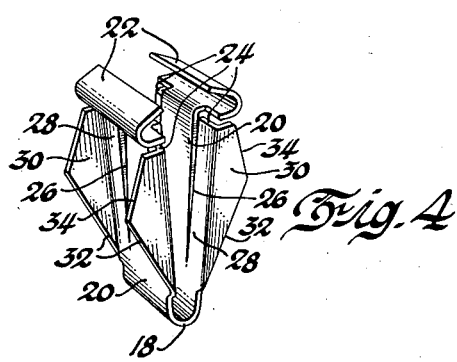
Fig. 4 is a perspective view of the fastening device.

My improved fastening device is formed of spring metal and consists of a U-shaped body portion 18 having legs 20 which are provided with gripping portions 22 formed at the ends thereof by bending the metal outwardly, upwardly and then inwardly. As best shown in Fig. 4, the metal of the body portion is sheared or slit inwardly from each side as at 24 and then downwardly as at 26 to a point slightly above where the legs are joined together. This results in forming portions which I designate angular locking portions 28 at each side of each leg, and it will be seen that since the fastening device is formed of spring metal, these locking portions may be sprung toward or away from each other without causing the position of the legs 20 to be changed. The outer edges 30 of these locking portions are bent outwardly to form wings and are cut so that inclined surfaces 32 and 34 are provided on each holding portion, these inclined surfaces extending inwardly in opposite directions from an apex located adjacent to the center of the outwardly bent edge.

As shown in Fig. 1, the fastening device is assembled to the part to be secured in place by causing the gripping portions 22 to embrace the flanges 16. This may be done either by springing the gripping portions apart until they may be pressed over the flanges, or by sliding them longitudinally along the flanges until they are spaced properly to register with the apertures formed at intervals in the supporting member. When each of the fastening devices is in line with an aperture, the molding or other part is pressed toward the supporting member, and the fastening device is forced into the aperture, the inclined surfaces 32 of the holding portions bearing against the edge of the aperture. This causes the holding portions to be sprung inwardly or toward each other until the apices of the outwardly bent edges pass through the aperture, whereupon the holding portions spring outwardly so that the oppositely inclined surfaces 34 on the bent edges of the holding portions bear against the edge of the aperture. This of course not only firmly holds the fastening device in position in the aperture, but due to the inclination of the surface 34 tends to draw the fastening device further into the aperture, thereby causing the molding or other part to be tightly held against the supporting member.

Figure 5:
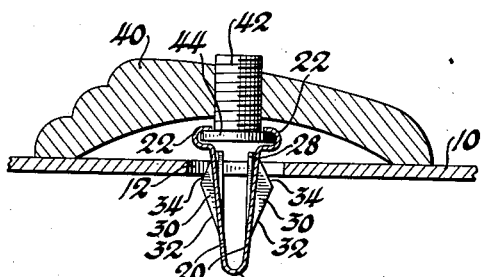
Fig. 5 is a view similar to Fig. 1, but showing the use of my improved fastening device to secure a differently shaped part to a supporting member.
Figure 3:
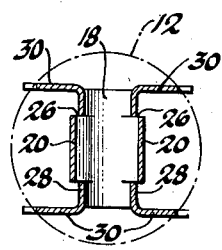
Fig. 3 is a sectional view, taken on the line 3—3 of Fig. 1, through my improved fastening device.

In Fig. 5 I have shown the fastening device as being used to hold a part of somewhat different shape in place against a supporting member. Here since the nature of the part 40 is such that it would not be practicable to form flanges such as 16 in Fig. 1 upon it, one or more threaded elements 42 having heads 44 are screwed into the part, and the gripping portions 22 of the fastening devices embrace the heads of the threaded elements. The construction and operation of the fastening devices shown in Fig. 5 is the same as that shown in Figs. 1 to 4.

It will be seen that I have thus provided a fastening device which not only may be used in connection with supporting members of varying thicknesses, because of the fact that the inclined surfaces 34 are of considerable length, but this also permits the fastening device to be used with parts of different dimensions within reasonable limits. Another advantage of the structure described is that since the holding portions 28 are free to move toward or away from each other without causing the position of the legs 20 or the gripping portions 22 to be changed, the fastening devices may be assembled at properly spaced intervals along the part to be secured to the supporting member, and movement of the holding portions in inserting or removing the fastening devices from the apertures will not cause the fastening devices to move relative to the part they are secured to.

It will be understood of course that while I have shown and described a specific embodiment of my invention, various changes in the design may be made without departing from the spirit and scope of the appended claims.

I claim:

1. In a metallic fastening device adapted to be applied to an opening and having a generally U-shaped body portion having resilient sides, lateral wings on the edges of the resilient sides, inclined end edges on the wings, said inclined edges adapted to engage with the underside of an opening when the device is in position, gripping legs, said legs comprising a part of the metal of the body portion between the wings and said legs being integrally connected to the base at its lower end only, said legs being bent inwardly of the U-shaped body portion to give them resiliency, and shaped parts on the ends of the legs shaped to grip an object.

2. In a metallic fastening device adapted to be applied to an opening and having a generally U-shaped body portion having resilient sides, said body portion comprising four angular parts connected at their ends by the bight of the U, one of the sides of each angle part extending away from the U and forming lateral wings, inclined edges on the wings adapted to engage with the edge of the opening when the fastening device is in position to hold the fastening device to the body to which it is applied, two legs, one leg between each pair of angle parts, said legs being integrally connected with the body portion adjacent the bight of the U and extending generally parallel with and beyond the ends of the angle parts, said legs comprising a part of the metal of the body portion between the angle parts and being inwardly bent to give the legs greater resiliency in gripping an object, and shaped parts on the ends of the legs to enable the legs to grip an object therebetween.

3. In a metallic fastening device adapted to hold an object in an opening in a surface, a generally U-shaped body portion having resilient sides, lateral wings on the body portion, inclined top and bottom edges on the wings, one pair of inclined edges enabling an easy insertion of the fastening device in the opening, the other pair of inclined edges adapted to engage with the edge of the opening to hold the device in position, legs formed from the metal of the base member, said base having slits therein to disconnect the sides of the legs from the base, one end of said legs being integrally connected to the base adjacent the bight of the U, said legs projecting beyond the end of the base, and gripping parts formed at the ends of the legs and adapted to hold an object.

BART COTTER.